UNITED STATES PATENT OFFICE.

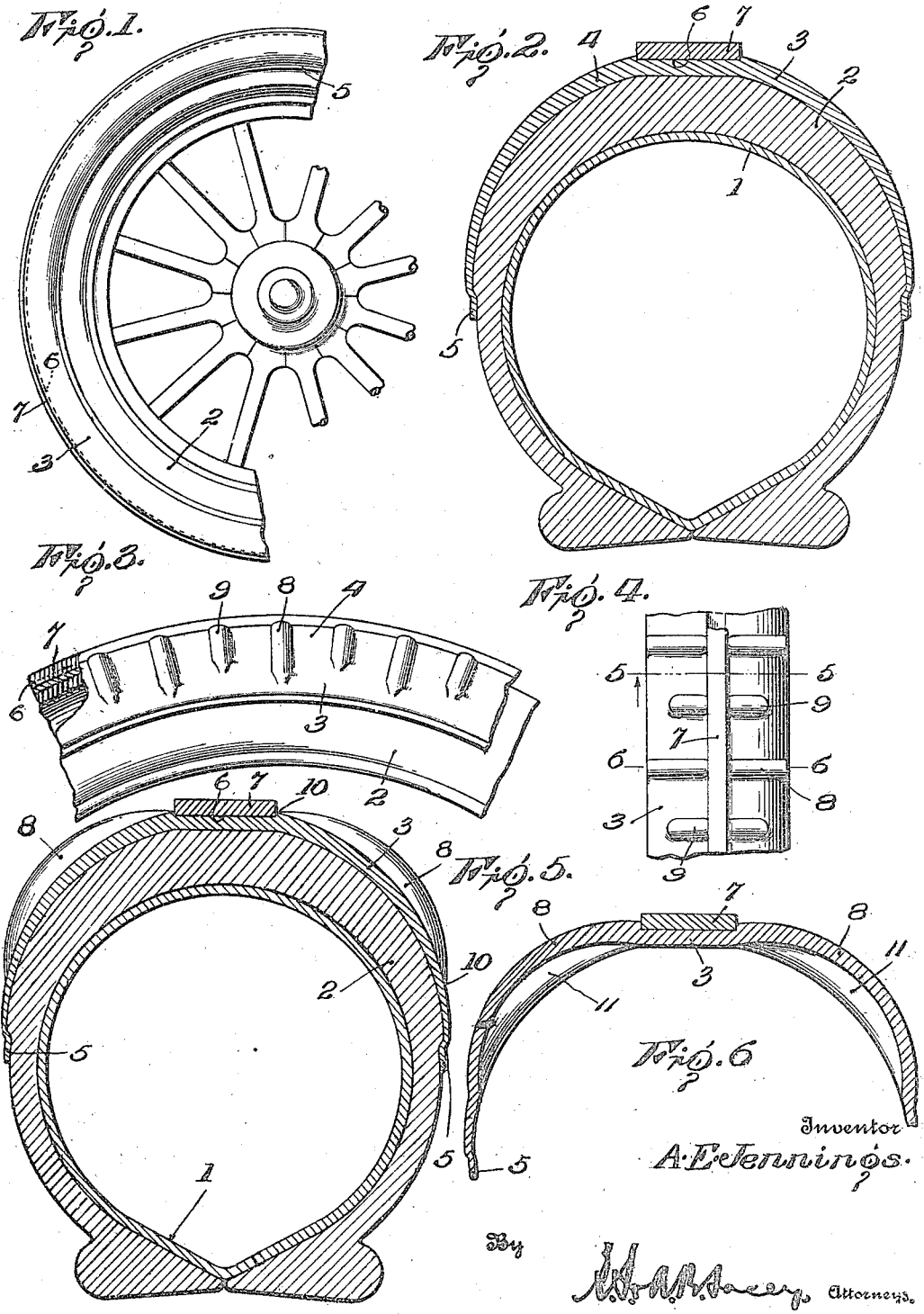

AARON E. JENNINGS, OF OWENSBORO, KENTUCKY.

TIRE-ARMOR.

1,255,754.  Specification of Letters Patent. Patented Feb. 5, 1918.

Application filed March 6, 1917. Serial No. 152,713.

*To all whom it may concern:*

Be it known that I, AARON E. JENNINGS, a citizen of the United States, residing at Owensboro, in the county of Daviess and State of Kentucky, have invented certain new and useful Improvements in Tire-Armors, of which the following is a specification.

This invention relates to armor for pneumatic vehicle tires and while the principles of the invention may be embodied in armor designed for application directly to an inflated vehicle or bicycle tire, the armor is designed primarily for application to the casings for inner tubes for the purpose of protecting the said casings from punctures and blow-outs.

It is one aim of the invention to provide an armor which, while in itself relatively rigid, will not by reason of its presence upon the tire, detract from the resiliency thereof, but will, on the other hand, present a rounded tread surface as distinguished from the relatively flat tread face which is presented by the ordinary tire casing due to the weight imposed thereon, so that a vehicle, the tires of which are equipped with the armor, may be driven at a higher rate of speed than is ordinarily possible.

It is another aim of the invention to provide an armor of this type which when in place upon the tire casing will fit closely thereto and intimately engage therewith so as to eliminate the frictional heating which frequently occurs in the devices now generally used.

Another aim of the invention is to provide an armor of this class which will require no fastening devices for the purpose of holding it upon the tire casing and which will yet be securely held against creeping about the casing and against rubbing contact with the casing which would be liable to harden or deteriorate the rubber of the casing.

The invention further aims to provide a tire armor possessing such a degree of rigidity as to cause it to equalize the strain upon the locking beads of the casing while rounding curves in the road, thereby distributing the strain substantially equally over at least the lower third of the tire, eliminating rim cuts in the tires and tearing of the fabric near the said locking beads.

The invention aims further to provide an armor of this class which will serve to evenly distribute the pressure against the casing incident to the weight imposed upon the wheels so that there will be little or no likelihood of the casing becoming injured by reason of blow-outs.

The invention also aims to provide an armor of this class with a tread portion which, when it becomes worn down, may be removed and renewed at little cost, thereby practically restoring the armor to its original condition and greatly prolonging the life thereof.

It is still another aim of the invention to form upon the outer surface of the armor protuberances designed to prevent skidding of the vehicle wheel to which the armor is applied and in the formation of these protuberances to produce in the inner surface of the armor, or in other words, that surface which is presented next the tire casing, correspondingly formed depressions into which the material of the casing may sink as the tire is inflated, thereby effectually preventing the creeping of the armor about the casing, as above stated.

In the accompanying drawings:

Figure 1 is a side elevation of one form of the armor embodying the present invention applied to a vehicle wheel of the ordinary type;

Fig. 2 is a vertical transverse sectional view therethrough;

Fig. 3 is a view similar to Fig. 1 illustrating a slightly modified form of armor;

Fig. 4 is a plan view of a portion of the armor shown in Fig. 3;

Fig. 5 is a sectional view on the line 5—5 of Fig. 4, and

Fig. 6 is a similar view on the line 6—6 of Fig. 4.

In the accompanying drawings, the numeral 1 indicates the inflated tube, and 2 the tire casing which is of the ordinary type and which houses the said tube. The armor embodying the present invention is in the nature of an annular metallic body 3 which in cross section is approximately semi-circular both interiorly and exteriorly and which is relatively thin, the body being designed to embrace and protect the tread surface of the casing 2 and a portion of each side wall of the casing, as clearly shown in Figs. 2 and 5 of the drawings. The body 3 is preferably of slightly greater thickness at its tread portion, as indicated by the numeral 4, than at its edges and is further preferably gradually decreased in thickness from its said tread portion toward each edge and if desired each edge portion of the body may be slightly offset inwardly, as indicated by the numeral 5, so as to slightly press into the side walls of the tire casing and thereby more firmly anchor the armor upon the said casing. In that form of the invention shown in Figs. 1 and 2 of the drawings, the outer surface of the body 3 may be left smooth or, if desired, it may be suitably roughened and its tread portion 4 in both forms of the invention illustrated is formed in its outer surface with a circumferentially extending relatively shallow channel 6, the bottom wall of which is cylindrical and the side walls of which are perpendicular. The armor is provided with a tread band, which is indicated by the numeral 7, and this band is in the nature of an annulus and is of a width substantially equal to the width of the channel 6 and of a thickness greater than the depth of the channel. Interiorly this band is of a diameter equal to the diameter of the body 3 at the bottom of the recess 6 and in applying this band to the body the band is first heated and then fitted on to the body and allowed to cool so that upon shrinking it will seat firmly within the channel 6 and will in effect constitute an integral part of the body 3. As before stated, the tread band 7 is of a thickness greater than the depth of the channel 6 and, consequently, the band will project outwardly from the channel a short distance so as to constitute the true tread of the armor. It will be apparent that as the outer surface of the band 7 is relatively broad and not transversely curved, there will be little likelihood of the armor skidding. It will also be apparent that the tread band 7 will be subjected to the greatest wear and that, therefore, the body 3 will be more or less protected and not liable to become worn thin. When the tread band has become considerably worn down it may be cut and removed and a new band may be applied to the body 3, thereby practically restoring the armor to its original condition at the small expense attending the replacement of the said tread band.

In that form of the invention shown in Figs. 3 to 6, inclusive, the body 3 is stamped at intervals to form upon its outer surface transversely extending ribs 8 and 9, there being two series of the ribs 8 and two series of the ribs 9 and the two series of ribs 8 are located at opposite sides of the channel 6 as are also the two series of ribs 9. By reference to Figs. 3 and 4 of the drawings it will be observed that the ribs 8 and 9 alternate and that the ribs 9 are shorter than the ribs 8. The ribs 8 and 9 are transversely rounded so that no sharp edges are presented and at their inner ends the said ribs terminate at the opposite sides of the channel 6 and gradually merge at their said ends, as well as at their outer ends, with the outer surface of the body 3, as indicated by the numeral 10. In forming the ribs 8 and 9, corresponding depressions 11 are formed in the inner surface of the body 3 and when the tire is inflated the outer surface of the casing 2 will be caused to sink into these depressions, thereby securely anchoring the armor upon the tire casing and preventing its creeping about the casing and also preventing any tendency toward lateral displacement of the armor with relation to the casing.

It will be understood that in all forms of the invention the body 3 will be relatively rigid and, consequently, the pressure resulting from the weight imposed upon the vehicle wheels will be evenly distributed about the circumference of the tire and there will be little or no likelihood of blow-outs occurring. It will also be understood that the ribs 8 will serve to prevent slipping of the wheels and increase the traction thereof and that the projecting portion of the band 7 will tend to prevent skidding of the wheels. It will also be observed and particularly by reference to Fig. 6 of the drawings that the outer surface of the tread band 7 projects beyond the outer sides of the ribs 8 and 9. In other words, no portion of the ribs 8 and 9 projects beyond the outer surface of the said tread band and therefore the ribs do not interfere with proper contact of the band with the road surface.

Having thus described the invention, what is claimed as new is:

1. Tire armor comprising a single relatively rigid undivided annulus having a central circumscribing channel in its outer surface and provided at opposite sides of said channel with hollow transverse ribs to externally engage a road surface and internally receive and hold portions of the tire, and a continuous relatively rigid tread band seated in the circumscribing channel and projecting beyond the surface of the armor.

2. Tire armor comprising a relatively rigid undivided annulus having a central circumscribing channel in its outer surface and provided at opposite sides of said channel with hollow transverse ribs to externally engage a road surface and internally receive and hold portions of the tire, the ends of said ribs merging into the outer surface of the armor, and a continuous rigid tread band seated in the circumscribing channel and projecting beyond the surface of the armor.

In testimony whereof I affix my signature.

AARON E. JENNINGS. [L. S.]